Patented Aug. 7, 1934

1,969,659

UNITED STATES PATENT OFFICE 1,969,659

ADHESIVE

William W. McLaurin, Brookfield, Mass.; Old Colony Trust Company executor of said William W. McLaurin, deceased No Drawing. Application July 13, 1931, Serial No. 550,617

7 Claims. (Cl. 87—17)

This invention relates to adhesives and to methods of making adhesives. It is more especially, but not exclusively, concerned with adhesives adapted for use in the manufacture of sealing tapes, reinforcing tapes, stay strips, plied sheet materials, and the like.

Reinforcing and sealing tapes are much used in the manufacture of boxes and cartons and in the sealing of cartons and packages. For many purposes it is desirable to secure such tapes and strips to the boxes, cartons, or packages with a waterproof adhesive. For example, this is desirable in packing goods for cold storage or for ocean shipments where the packages are to be exposed to a humid atmosphere for long periods of time. Under such circumstances the use of water soluble adhesives is objectionable because of their liability to become softened to such an extent that they will let go.

Only a relatively limited number of adhesives which are "waterproof", or more correctly, water resistant, are suitable for this purpose. Waterglass has been used to some extent but is not very satisfactory because of its extreme brittleness and the fact that it dries slowly. Asphalt, or a mixture in which asphalt is the predominating constituent, has also been used to some extent. Sealing and reinforcing tapes coated with asphalt preparations were used experimentally some years ago, but the difficulties in making such tapes and applying them have prevented their use to any substantial degree. The fact that the asphalt must be applied to the tape originally in a melted condition introduces rather serious practical difficulties in the manufacture of these tapes, particularly since the asphalt must be heated to in the neighborhood of 400° or 450° F. Furthermore, the tendency of the asphalt to penetrate through cambrics and other fabrics which are commonly used for backing materials in such tapes makes the process hard to control. In addition, when the tape is applied to a box, carton, or the like, the asphalt coating must be softened sufficiently by heat to cause it to bond to the carton, box, or other packages, and this fact makes it extremely difficult to apply such tapes at speeds which are satisfactory to the trade.

The present invention deals particularly with these problems. It aims to devise an adhesive which can be used satisfactorily for these purposes, which will avoid the necessity for the unusual and expensive equipment heretofore required in the manufacture of asphalt coated tapes, and which will permit the application of such tapes to boxes, cartons, and the like, at satisfactory speeds.

I have found that these objects can be realized by using an adhesive consisting of a mixture of emulsified asphalt with a suitable water soluble adhesive. Aqueous emulsions of asphalt are readily obtainable in the open market, and a wide variety of compositions are available having various degrees of flexibility, brittleness, different melting points, and variations in other characteristics. For sealing and reinforcing tapes it is desirable that the adhesive shall have a fairly high degree of flexibility, and asphalt compositions suitable for this purpose are readily obtainable in an emulsified form. Usually these commercial emulsions contain approximately 60% of asphalt, and they have a relatively thick pasty consistency. It is entirely possible, however, to thin them with water sufficiently to improve their fluidity, simply by mixing water with them in a beater. Glue or other water soluble adhesives can be added to these emulsions by dissolving the adhesive in water and mixing the solution so formed with the asphalt emulsion.

I have obtained particularly satisfactory results by adding approximately 10% of water to the ordinary commercial emulsions so as to reduce the asphalt content to approximately 50%, making a 50% solution of the glue or other water soluble adhesive to be mixed with the emulsion, and then mixing the two in a beater, the agitation of the mixture being continued until it assumes a substantially homogeneous consistency. The mixture so formed can then be applied to the paper, fabric, or other backing material for the reinforcing or sealing tapes in a coating machine of the type commonly used to apply water soluble adhesives to paper and fabrics in the manufacture of gummed papers and tapes.

The nature of the water soluble adhesive and the proportions of the adhesive and alphalt necessarily will be selected in accordance with the requirements of the work. In reinforcing and sealing tapes I prefer to use an animal or fish glue, the proportion of glue being between 10% and 30%, by weight, of the asphalt content of the emulsion. I have obtained especially favorable results by using a hard grade of animal glue with the emulsion, such a glue assisting in stabilizing the emulsion and improving the "riding" qualities of the entire mixture. In other words, it reduces the tendency of the asphalt to penetrate through the fabric or paper and assists in holding the coating on the surface to which it is applied. If a hard glue is used with the asphalt it is preferable to raise the temperature moderately, say to 90° or 100° F. in applying the mixture to the paper, fabric, or other backing material. After the backing material has been coated with the mixture the coating may be dried, preferably with heat, sufficiently to make it hard and non-tacky at normal temperatures.

A mixture of this character not only avoids the necessity for using an expensive asphalt melting equipment in preparing the asphalt for application to the tape, but it also has the very important practical advantage of permitting the use of such a tape in the ordinary taping or sealing machines commonly used to apply tapes or sealing strips coated with a water soluble adhesive. That is, the water soluble adhesive in the asphalt and glue mixture will adhere to the cartons, boxes, packages, and the like, simply by being moistened in the customary manner and then pressed against the work. The water soluble constituent of the mixture thus is utilized to produce an initial bond in the usual way and in the ordinary machiney. Thereafter the cartons or boxes can be run through a machine equipped with heated belts or other devices which will melt the asphalt and cause it to fuse both to the carton and also to the backing strip on which the mixture is carried, thus utilizing both the asphalt and the glue to bond the backing material securely to the carton or box.

While I prefer to use asphalt in an emulsified form, some advantages of this invention can be obtained by mixing the glue and asphalt together while both constituents are in a melted condition. A tape coated with such a mixture can be applied to cartons, boxes, and the like, in the manner above described, and these advantages of the mixture can thus be obtained. The manufacture of the tape, however, is greatly facilitated by the use of the emulsion, and I therefore consider the method in which an emulsion is used far superior to the expedient just described.

The adhesive provided by this invention is also useful in combining webs of paper or cloth, or paper and fabric in making plied sheet materials.

While I have herein described typical compositions embodying this invention, it will be understood that the invention may be embodied in a great variety of forms without departing from the spirit or scope thereof.

Having thus described my invention, what I desire to claim as new is:

1. That improvement in methods of making adhesives which consists in mixing a water solution of glue with an aqueous asphalt emulsion, both constituents being present in high proportions, and agitating the mixture until it assumes substantially a homogeneous consistency.

2. An adhesive comprising a mixture containing a high percentage of an aqueous emulsion of asphalt and a smaller percentage of glue, the dry weight of the glue being equal to at least ten percent of the dry weight of the asphalt.

3. An adhesive comprising a mixture of an aqueous emulsion of asphalt and a solution of a water soluble adhesive, the proportion of the dry weight of the water soluble adhesive being from ten to fifty percent of the dry weight of the asphalt.

4. An adhesive comprising a mixture of an aqueous emulsion of asphalt and an aqueous solution of a hard animal glue, the dry weight of the glue being at least ten percent of the dry weight of the asphalt.

5. An adhesive comprising a mixture of asphalt and a water soluble adhesive with the asphalt predominating but the dry weight of the water soluble adhesive being equal to from ten percent to fifty percent of the dry weight of the asphalt.

6. An adhesive comprising a mixture of an aqueous emulsion of asphalt and a water soluble adhesive, with the asphalt predominating, and the dry weight of the water soluble adhesive being between approximately 10% and 30% of the dry weight of the asphalt.

7. An adhesive comprising a mixture of an aqueous emulsion of asphalt and glue, with the asphalt predominating, and the dry weight of the glue being at least 10% of the dry weight of the asphalt.

WILLIAM W. McLAURIN.